United States Patent
Hartley et al.

(10) Patent No.: US 11,431,548 B2
(45) Date of Patent: *Aug. 30, 2022

(54) HIGH-ASSURANCE MULTI-DOMAIN NETWORK SWITCH

(71) Applicant: ARCHITECTURE TECHNOLOGY CORPORATION, Eden Prairie, MN (US)

(72) Inventors: Timothy E. Hartley, Eden Prairie, MN (US); Ranga S. Ramanujan, Medina, MN (US); Clint M. Sanders, Plymouth, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/813,142

(22) Filed: Mar. 9, 2020

(65) Prior Publication Data

US 2020/0267044 A1    Aug. 20, 2020

Related U.S. Application Data

(63) Continuation of application No. 15/583,661, filed on May 1, 2017, now Pat. No. 10,587,450.

(Continued)

(51) Int. Cl.
*H04L 29/06* (2006.01)
*H04L 9/40* (2022.01)
(Continued)

(52) U.S. Cl.
CPC .... *H04L 29/06585* (2013.01); *H04L 12/4641* (2013.01); *H04L 45/04* (2013.01); *G06F 9/45558* (2013.01); *H04L 47/785* (2013.01)

(58) Field of Classification Search
None
See application file for complete search history.

(56) References Cited

U.S. PATENT DOCUMENTS

| | | |
|---|---|---|
| 9,049,148 B1 | 6/2015 | Singh |
| 2010/0198972 A1 | 8/2010 | Umbehocker |

(Continued)

OTHER PUBLICATIONS

"Configuring VLAN Groups", CISCO, Access from the Internet at: http://www.cisco.com/c/en/us/td/docs/switches/lan/catalyst3850/software/release/3se/vlan/configuration_guide/b_vlan_3se_3850_cg/b_vlan_3se_3850_cg_chapter_0101.html on May 2, 2017, pp. 1-10.

(Continued)

*Primary Examiner* — Cai Y Chen
(74) *Attorney, Agent, or Firm* — Carlson, Caspers, Vandenburgh & Lindquist, P.A.

(57) ABSTRACT

Embodiments for a method of implementing multiple domains in a network switching device are disclosed. The method includes assigning a plurality of hardware ports to a plurality of domains. Ports are assigned to at least two of the plurality of domains, and none of the ports are concurrently assigned to multiple domains. The method also includes loading rules for forwarding packets between the plurality of ports into a data plane. The rules direct the data plane to forward only between ports in a common domain of the plurality of domains. The method also includes assuring that a packet received at any port assigned to a first domain is not sent in legible form from any port assigned to a second domain if an error causes the data plane to forward or request forwarding the packet to any port assigned to a second domain.

23 Claims, 6 Drawing Sheets

Related U.S. Application Data

(60) Provisional application No. 62/329,394, filed on Apr. 29, 2016.

(51) Int. Cl.
  *H04L 12/46* (2006.01)
  *H04L 45/02* (2022.01)
  *H04L 47/785* (2022.01)
  *G06F 9/455* (2018.01)

(56) References Cited

U.S. PATENT DOCUMENTS

| | | |
|---|---|---|
| 2012/0163388 A1 | 6/2012 | Goel et al. |
| 2014/0233581 A1* | 8/2014 | Namihira .............. H04L 49/356 370/408 |
| 2014/0244851 A1* | 8/2014 | Lee .................... H04L 12/4641 709/228 |
| 2018/0069754 A1 | 3/2018 | Dasu et al. |

OTHER PUBLICATIONS

Bailey, Stuart et al., "SDN Architecture Overview", Open Networking Foundation, Dec. 12, 2013, pp. 1-5.

Hoffman, Chris, "VLAN Security in the LAN and MAN Environment", SANS Institute, Apr. 27, 2003, pp. 1-13.

Pfaff, Ben et al., "Extending Networking into the Virtualization Layer", Eighth ACM Workshop on Hot Topics in Networks (HotNets—VIII), Oct. 22-23, 2009, pp. 1-6, New York City, NY.

Pfaff, Ben et al., "The Design and Implementation of Open vSwitch", 12th USENIX Symposium on Networked Systems Design and Implementation, May 4-6, 2015, pp. 1-14, Oakland, CA.

Rouiller, Steve, "Virtual LAN Security: weaknesses and countermeasures", SANS Institute, Jan. 2006, pp. 1-50.

U.S. Patent and Trademark Office, "Final Office Action", U.S. Appl. No. 15/583,661, dated Apr. 30, 2019, pp. 1-9.

U.S. Patent and Trademark Office, "Notice of Allowance", U.S. Appl. No. 15/583,661, dated Oct. 17, 2019, pp. 1-7.

U.S. Patent and Trademark Office, "Office Action", U.S. Appl. No. 15/583,661, dated Nov. 19, 2018, pp. 1-8.

\* cited by examiner

HIGH-ASSURANCE MULTI-DOMAIN NETWORK SWITCH

RELATED APPLICATION

This application is a continuation of U.S. patent application Ser. No. 15/583,661, filed on May 1, 2017, entitled "HIGH-ASSURANCE MULTI-DOMAIN NETWORK SWITCH", which claims priority to U.S. Provisional Application No. 62/329,394, filed on Apr. 29, 2016, entitled "HIGH-ASSURANCE DYNAMICALLY PARTITIONED NETWORK SWITCH", both of which are hereby incorporated herein by reference.

GOVERNMENT CONTRACT

This invention was made with government support under contract FA8650-14-M-1764 awarded by the United States Air Force. The government may have certain rights in the invention.

BACKGROUND

Current virtual local area network (VLAN) switches can implement multiple distinct local area networks (LANs) in a single switch. A VLAN switch allows different hardware ports of the switch to be statically assigned to different LANs. Each LAN operated on by the switch is referred to as a VLAN and the hardware ports assigned to a common VLAN are said to be in a common VLAN group. A user manually configures the switch to statically assign the hardware ports of the VLAN switch to a respective VLAN.

Current VLAN switches, however, are susceptible to corrupted data structures controlling packet switching decisions, which could cause the VLAN switch to leak traffic from one VLAN to another VLAN. Such a corrupted data structure could be caused by a surreptitious action, e.g., an intentional memory overflow, or a random action, e.g., a single event interrupt. Accordingly, such VLAN switches are not suitable to situations in which high assurance isolation is desired between respective VLANs. The current method of ensuring that data does not leak from one LAN to another is to use distinct switches for each LAN, with distinct network connections for each LAN.

BRIEF DESCRIPTION

Embodiments for a method of implementing multiple domains in a network switching device are disclosed. The network switching device has a plurality of hardware ports. The method includes assigning a plurality of hardware ports to a plurality of domains Hardware ports are assigned to at least two of the plurality of domains, and none of the plurality of hardware ports are concurrently assigned to multiple domains of the plurality of domains. The method also includes loading rules for forwarding packets between the plurality of hardware ports into a data plane for the network switching device. The rules direct the data plane to forward only between ports in a common domain of the plurality of domains. The method also includes assuring that a packet received at any hardware port assigned to a first domain of the plurality of domains is not sent in legible form from any hardware port assigned to a second domain of the plurality of domains if an error causes the data plane to forward or request forwarding the packet to any hardware port assigned to a second domain of the plurality of domains.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
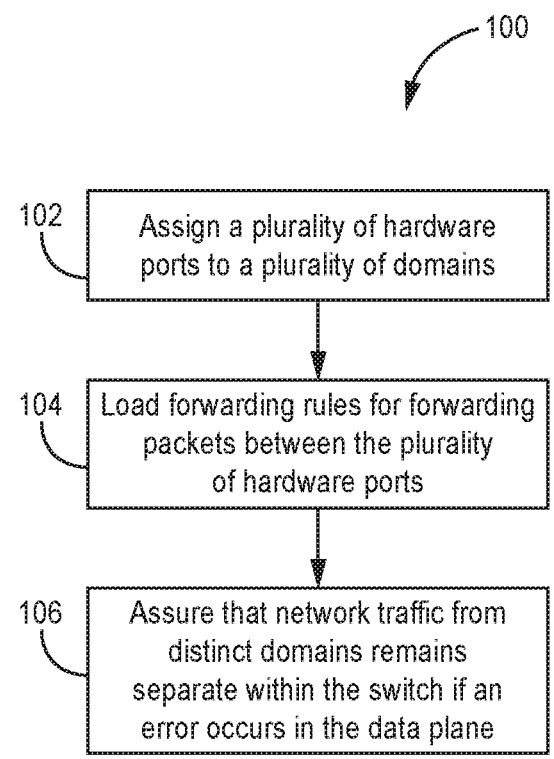
FIG. 1 is a flow diagram of an example method of implementing multiple domains in a network switching device.

FIG. 1 is a flow diagram of an example method 100 of implementing multiple domains in a network switching device. Method 100 is a method executed by a network switching device to implement multiple domains in the switch while achieving high-assurance that traffic in a given domain cannot leak through the switch into another domain. In an example, each domain implemented by the network switching device is a distinct local area network (LAN). Each LAN can operate in compliance with one or both of an Ethernet standard (in accordance with an IEEE 802.3 standard) or a Wi-Fi standard (in accordance with an IEEE 802.11 standard). As used herein the terms "network switching device", "network switch", and "switch" include a layer 2 switch (e.g., multiport bridge), a layer 3 switch, and a router, unless it is clear from the context that one or more of these do not apply.

Method 100 includes assigning a plurality of hardware ports of the switch to a plurality of domains (block 102). Collectively, the hardware ports are assigned to at least two domains concurrently, that is, at least a first set of the hardware ports are assigned to a first domain and a second set of the hardware ports are assigned to a second domain. Two or more than two domains can be implemented in the network switch concurrently. The network switch can also operate in single domain mode, in which only a single domain at a time is implemented.

While multiple domains are implemented concurrently on the network switch, each hardware port assigned to a domain is assigned to a single domain only. That is, no hardware ports are concurrently assigned to two domains. Thus, a first set of hardware ports can be assigned to a first domain and a second set of hardware ports can be assigned to a second domain, but there is no overlap of hardware ports between the first set and the second set. Each set of hardware ports for a domain is disjoint from each other set of hardware ports for other domains implemented on the network switch.

Method 100 also includes loading rules for forwarding packets between the plurality of hardware ports into a data plane of the network switch (block 104). The forwarding rules are implemented such that traffic arriving at a (incoming) hardware port can only be forwarded to an (outgoing) hardware port that is assigned to a common domain with the incoming hardware port. Thus, the forwarding rules maintain traffic within its domain while the traffic is traversing the switch. In examples in which each domain is a distinct LAN, these forwarding rules are set up according to the LANs, such that each hardware port can forward traffic to other hardware ports in a common LAN, but not to hardware ports in other LANs. External network devices connected to a common LAN of the switch have direct communication with each other including layer-2 broadcast and services dependent on layer-2 broadcast like ARP discovery and DHCP discovery. External network devices connected to different LANS of the switch have no direct communication, but could communicate via an uplink (e.g., a router) to maintain traffic separation.

Method 100 also provides assurance that distinct domains within the switch will remain isolated (block 106). While loading forwarding rules that forward traffic only between hardware ports assigned to a common domain, which provides some isolation between the domains, the network switch assures that the domains remain isolated by assuring such isolation even if an error causes the data plane to forward or request forwarding a packet to a hardware port assigned to a domain that is different than the domain assigned to the hardware port at which the packet was received. The network switch assures such isolation by assuring a packet received at any hardware port assigned to a first domain is not sent in legible form to any hardware port assigned to a different domain (than the first domain) if an error causes the data plane to forward or request forwarding the packet to such a hardware port assigned to a different domain. Such an error can include a corrupted data structure controlling packet switching decisions. A corrupted data structure could be caused by a surreptitious action, e.g., an intentional memory overflow, or a random action, e.g., a single event interrupt. In addition to protecting the network packets in one domain from network nodes in other domain, the domain isolation can also protect the identity of a network node communicating in one domain from network nodes in other domains.

Figure 2:
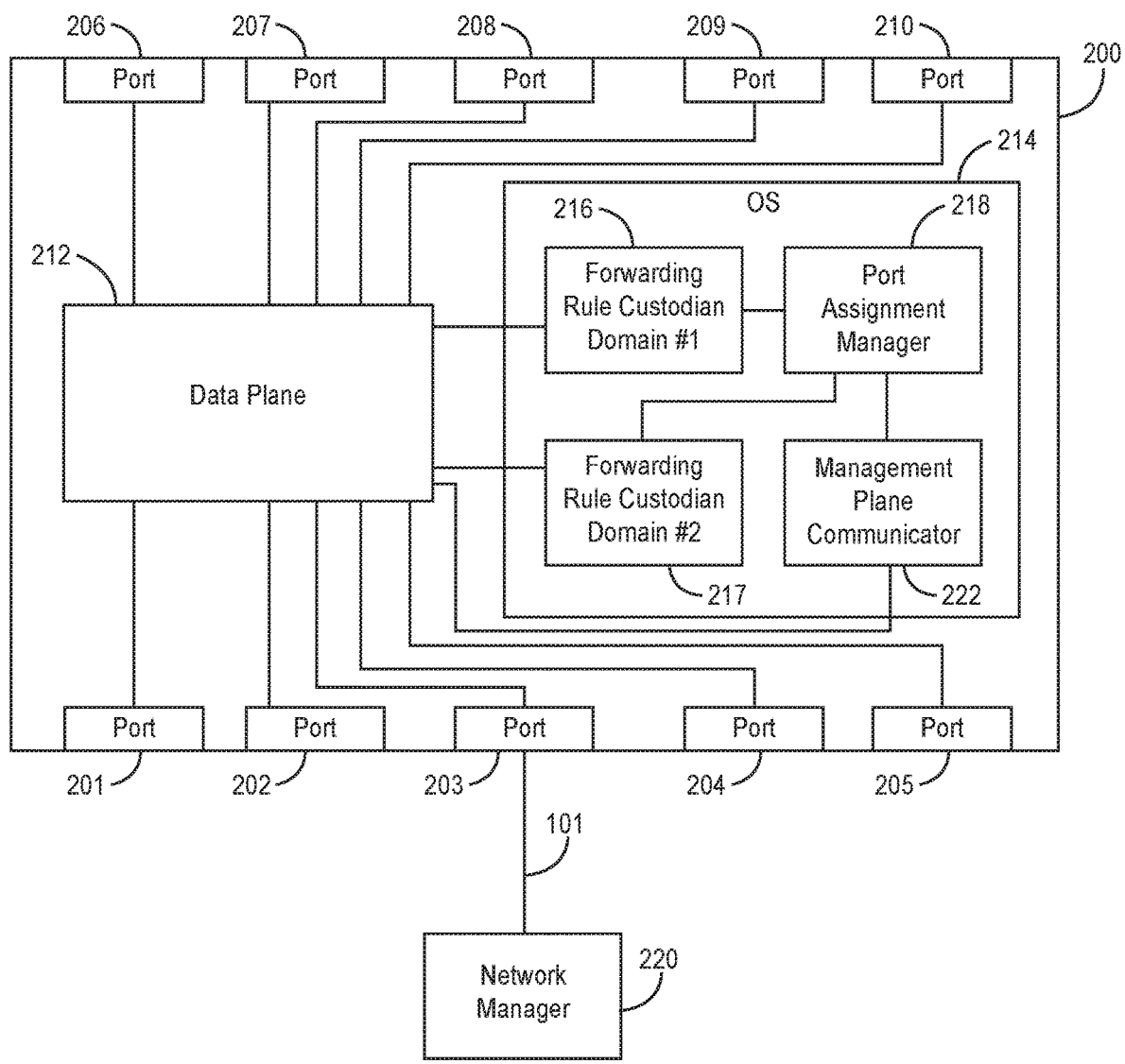
FIG. 2 is a block diagram of an example network switching device for implementing the method of FIG. 1.

FIG. 2 is a block diagram of an example network switch 200 implementing method 100 of FIG. 1. The switch 200 includes a plurality of hardware ports 201-210. Each hardware port 201-210 (also referred to herein as simply a "port") is a physical network interface for connecting a physical communication medium (PCM), a wired-to-wireless-link adapter, or an electrical-to-optical transceiver to the switch 200. Example physical network interfaces include a copper jack (e.g., an RJ45 jack, coax connector), an optical jack (e.g., an LC connector), and an optical transceiver slot (e.g., an SFP optical transceiver slot). Example PCMs include category cables (e.g., Cat 5e, Cat 6, Cat 6A), coax cables, and fiber optic cables. An example wired-to-wireless-link adapter is an Ethernet-to-Wi-Fi bridge. An example electrical-to-optical transceiver is an SFP transceiver. Although ten (10) hardware ports 201-210 are shown in the example of FIG. 2, any number of hardware ports can be included.

Switch 200 also includes a data plane 212, which implements forwarding rules to forward packets between the plurality of hardware ports 201-210. In an example, the data plane 212 can direct packets received at a port 201-210 to an output port corresponding to the Media Access Control (MAC) address in the Ethernet header of the switch. The data plane 212 can be hardware implemented, or software implemented. A hardware implemented data plane includes a switch matrix that selectively couples packets from an incoming port 201-210 to an outgoing port 201-210. A software implemented data plane includes one or more software implemented traffic forwarding engines which couple packets between the ports 201-210.

Switch 200 also includes an operating system 214 upon which the software applications of the switch 200 run. Although not shown in FIG. 2, switch 200 includes one or more processing devices, coupled to memory. The one or more processing devices can include any one or more of a general-purpose processor (e.g., a central processing unit (CPU)) and a special-purpose processor (e.g., a digital signal processor (DSP) or graphics processing unit (GPU)). The memory can include any suitable form of random access memory (RAM) now known or later developed, such as dynamic random access memory (DRAM), as well as other types of memory. Switch 200 also includes one or more data storage mediums coupled to the one or more processing devices. The one or more data storage mediums can include any suitable computer readable medium providing non-volatile data storage including, but not limited to, magnetic media such as a hard disk drive (HDD), optical media such as a CD, DVD, or Blu-ray disk, and non-volatile electric media such as a solid-state drive (SSD), flash media, or EEPROM.

Switch 200 includes instructions stored or otherwise embodied on its respective one or more data storage mediums. The instructions, when executed by the one or more processing devices of the switch 200, cause the switch 200 to perform the actions coded in the instructions. The instructions include the operating system 214. In some examples, the switch 200 also includes one or more programmable logic devices (e.g., an FPGA). Such programmable logic devices can include programming to implement software defined traffic forwarding engines for a software implemented data plane 212. In other examples, the software defined traffic forwarding engines can be included in the instructions for the one or more processing devices and can run on the operating system 214.

The switch 200 can also include a forwarding rule custodian 216, 217 for each domain implemented by the switch 200. Each forwarding rule custodian 216, 217 manages a forwarding table for its corresponding domain. Each forwarding rule custodian 216, 217 loads forwarding rules corresponding to its forwarding table into the data plane 212. In the example shown in FIG. 2, the switch 200 implements two domains concurrently. Accordingly, a first forwarding rule custodian 216 manages a forwarding table for a first domain and a second forwarding rule custodian 217 manages a forwarding table for a second domain. In an example, the forwarding rule custodians 216, 217 can be implemented by suitably programming one or more programmable logic devices of the switch 200. In other examples, the forwarding rule custodians 216, 217 can be included in the instructions on the data storage mediums of the switch 200 and executed by the one or more processing devices. In such other examples, the forwarding rule custodians can run on the operating system 214.

Switch 200 also includes a port assignment manager 218 that manages the assignment of ports 201-210 to a domain. The port assignment manager 218 is included in the instructions and runs on the operating system 214. The port assignment manager 218 communicates with the forwarding rule custodians 216, 217 to effectuate an assignment of a port 201-210 to a domain.

In an example, each port 201-210 of the switch 200 can be independently assigned to a domain. The port assignment manager 218 assigns a port 201-210 in response to a command received over a network interface (e.g., port 201-210), a command line interface, or an application programming interface (API). In the example shown in FIG. 2, the port assignment manager 218 communicates over a port 203 with a network manager 220 that is located on a device external to the switch 200. The network manager 220 communicates with the port assignment manager 218 over a network link 221 to provide commands to the port assignment manager 218 to assign a port 201-210 to a domain. In an example, the network manager 220 is a management plane entity that has a wider view of the network and manages port assignments to implement multiple isolated domains across a network.

In some examples, the network manager 220 can provide a forwarding table to the switch 200 for a domain. The switch 200 can then use that forwarding table (e.g., in the forwarding rule custodian 216, 217 for that domain) and load rules corresponding thereto into the data plane 212. In an example, the forwarding table implemented by each forwarding rule custodian 216, 217 is static and can be updated only in coordination with the port assignment manager 218. Additionally, the data plane 212 can discard a packet received by the data plane 212 at a port that is not assigned to a domain. The data plane 212 can discard a packet that is received at a port assigned to a first domain, but addressed to a port in another domain. This is because the forwarding table for that domain will not include an entry for a port in another domain. The switch can notify the network manager 220 of a dropped packet and provide information regarding the dropped packet. The information can include the source MAC address and destination MAC address of the packet, and the port 201-210 at which the packet was received, among other things.

The network manager 220 or administrator can also provide the MAC address of the network interface connected to the other end of the network link for a port 201-210 of the switch 200. The switch 200 can use this information to verify that only packets received from that network interface on that port 201-210 are forwarded. Any other source MAC address would indicate an error in the configuration or in the network wiring. The network manager 220 or administrator can provide the MAC address of the network interface coupled to each port 201-210 assigned to a domain. In an example, the forwarding rule custodian 216, 217 does not implement a learning bridge. Instead the forwarding rule custodian 216, 217 can construct its forwarding table based strictly on the information received from the network manager 220 or administrator of the MAC addresses of the network interfaces coupled to the ports 201-210.

The communications between the network manager 220 and the port assignment manager 218 can be layer 2 or layer 3 messages, for example. Example network managers 220 are described in U.S. patent application Ser. No. 15/583,692, titled "PLANNED CLOUD RESOURCE MANAGEMENT", filed on even date herewith, and U.S. patent application Ser. No. 15/583,711, titled "MULTI-DOMAIN CLOUD COMPUTING", also filed on even date herewith, both of which are hereby incorporated herein by reference. In other examples, commands to assign a port to a domain can be received from an administrator (i.e., a human that administers the switch 200) via command line interface or API.

The switch 200 can also include a management plane communicator 222 that intermediates communication between the port assignment manager 218 and the network manager 220. The management plane communicator 222 can communicate with the network manager over the corresponding port 203 using the protocol of the network manager 220 (e.g., the OpenFlow protocol) and communicate with the port assignment manager 218 using the communication protocol of the port assignment manager 218 to realize the port assignment state reflecting the communicated commands of the network manager 220. In an example, the port assignment manager 218 dedicates a port 203 of the switch 200 to communications with a network manager 220. To dedicate the port 203 to such communications, the port assignment manager 218 does not assign the port 203 to any (data) domains and ensures that traffic to and from the port travels through the management plane communicator 222. The management plane communicator 222 can also authenticate the network manager 220 to ensure port assignments are being received from a proper entity.

To assure that domains remain isolated, the port assignment manager 218 can ensure that no port 201-210 on the switch 200 is concurrently assigned to multiple domains. The port assignment manager 218 assigns a port 201-210 to a domain in response to a corresponding command from an administrator (e.g., via a command line interface) or from a network manager 220. To assign a port 201 to a domain, the port assignment manager 218 communicates with the forwarding rule custodian 216, 217 for the domain to which the port 201 is to-be-assigned, commanding the forwarding rule custodian 216, 217 for that domain to add the port 201 to the forwarding table of the forwarding rule custodian. The forwarding rule custodian, then updates its forwarding table correspondingly, and loads updated forwarding rules into the data plane 212 based thereon. Likewise, to remove a port 201 from a domain, the port assignment manager 218 communicates with the forwarding rule custodian 216, 217 for the domain in which the port 201 is assigned, commanding the forwarding rule custodian 216, 217 to remove the port 201 from its forwarding table. The forwarding rule custodian 216, 217, then updates its forwarding table correspondingly, and loads updated forwarding rules into the data plane 212 based thereon.

One way in which the switch 200 assures that packets received at a port 201-210 assigned to a first domain cannot be sent from any port assigned to a different domain if there is an error is by having a distinct forwarding table and forwarding rule custodian 216, 217 for each domain. By having a distinct forwarding table custodian 216, 217 for each domain, it is less likely that an error (surreptitious or inadvertent), such as a memory overflow, that occurs when one forwarding table custodian 216, 217 is executing will cause a packet to be forwarded to a port 201-210 in another domain. That is, since a given forwarding rule custodian 216, 217 has no knowledge of, or interaction with, ports 201-210 in other domains, it is less likely that an error during execution of that forwarding rule custodian 216, 217 will cause an entry for a port 201-210 in another domain to be included in its forwarding table. To provide further assurance of domain isolation, the operating system 214 can restrict access to ports 201-210 that are assigned to different domains for forwarding table custodians 216, 217 and, for software implemented traffic forwarding engines, if implemented.

Additionally, in an example, the one or more processing devices of the switch 300 can control the memory data structures to hold/copy packets received at a port 201-210 during forwarding. In an example, the traffic forwarding engines 312, 313 can reduce the memory used for copying packets by copying pointers to shared memory block containing packet data rather than copying the packet itself. The switch can include direct memory access (DMA) hardware to copy data between the memory to hardware buffers faster than the processor could accomplish it. These memory techniques can be particularly advantageous for hardware implemented data planes that can copy data between buffers without CPU interaction.

Figure 3:
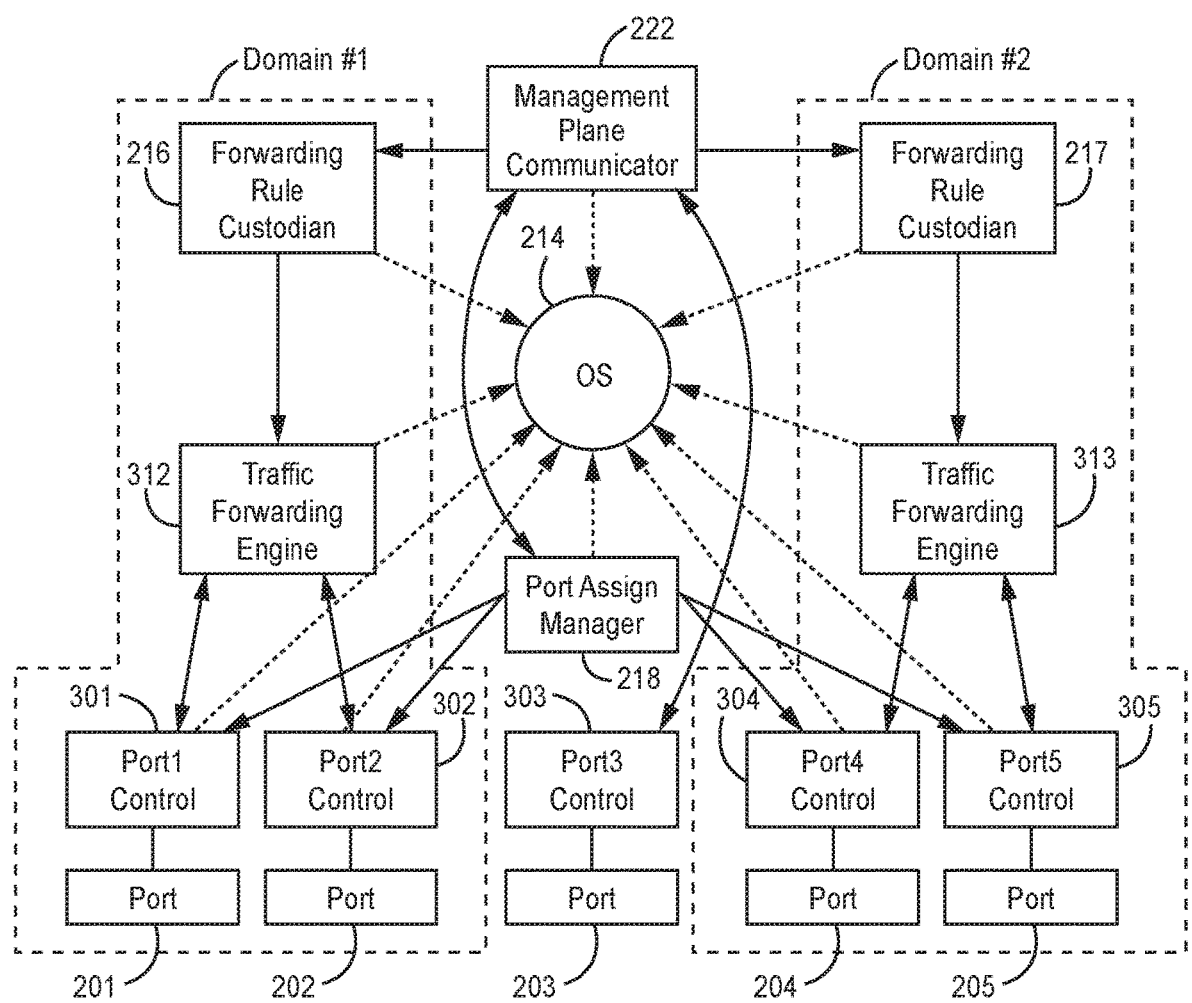
FIG. 3 is a block diagram of another example network switching device for implementing the method of FIG. 1.

FIG. 3 is a block diagram of an example switch 300 in which the operating system 214 can restrict access to ports 201-205 assigned to different domains. Although only five ports 201-205 are shown, any number of ports can be included. Switch 300 includes an operating system 214, a forwarding rule custodian 216, 217 for each domain, a port assignment manager, and a management plane communicator 222. Switch 300 implements the data plane in software. Accordingly, switch 300 includes a traffic forwarding engine 312, 313 for each domain. The traffic forwarding engine 312 and forwarding rule custodian 216 for a given domain can communicate with each other to effectuate loading of forwarding rules into the traffic forwarding engine 312. The traffic forwarding engine 312 and forwarding rule custodian 216 for a given domain, however, cannot communicate with traffic forwarding engines 313 and forwarding rule custodians 217 of other domains.

Switch 300 also includes a plurality of port controllers 301-310. Each port controller 301-310 implements the hardware driver and any additional frame handling for sending and receiving packets over one or more ports 201-210. In this example, each port controller 301-310 sends and receives packets for a single port 201-210, however, in other examples, a single port controller can send and receive packets for multiple ports 201-210. In examples where the switch 300 communicates with a network manager 200 over a port 203, the port controller 303 for that port 203 includes the TCP/IP stack to send and receive control plane packets.

The traffic forwarding engine 312, 313 can pool the port controller(s) 301-310 for ports assigned to its domain for received packets or can be notified by the port controllers(s) 301-310 for ports assigned to its domain when a packet is received. The traffic forwarding engine 312, 313 refers to a copy of the forwarding table for that domain and sends a received packet to the port controller 301-310 corresponding to the outgoing port 201-210 for the packet. The traffic forwarding engine 312, 313 has access to only the forwarding table for its domain, not forwarding tables for other domains.

The forwarding rule custodians 216, 217 can comprise the local control plane of the switch 200. The forwarding rule custodians 216, 217 receive control plane derived configuration regarding the packet forwarding table and update the table accordingly. Each forwarding rule custodian 216, 217 maintains the packet forwarding table for a single security domain. A forwarding rule custodian 216, 217 can handle all modification to its forwarding table, leaving the corresponding traffic forwarding engine 312, 313 the task of forwarding packets according to the forwarding rule of the table.

In a first example, the operating system 214 can be a hypervisor, and each forwarding table custodian 216, 217, traffic forwarding engine 312, 313, and port controller 301-310 can be implemented in a distinct virtual machine on the hypervisor. The hypervisor can control the access to the port controllers 301-310 for the traffic forwarding engines 312, 313. That is, the hypervisor can control access of the virtual machines in which the traffic forwarding engines 312, 313 are executing to the virtual machines in which the port controllers 301-310 are executing. In particular, the hypervisor can grant access for each traffic forwarding engine 312, 313 to the port controller(s) 301-310 corresponding to the ports 201-210 that are assigned to a common domain with the traffic forwarding engine 312, 313. The hypervisor, however, can provide no access to port controllers 301-310 in domains different than the domain of a traffic forwarding engine 312, 313. The same is true in reverse. That is, the hypervisor can provide no access for a port controller 301 to a traffic forwarding engine 313 in another domain. If a traffic forwarding engine 312 requests forwarding of a packet to a port 210 that is in a different domain than the traffic forwarding engine 312 is in, the hypervisor will prevent such forwarding by denying access of the virtual machine in which the traffic forwarding engine 312 is executing to the virtual machine in which the port controller 310 for that port 210 is executing. The hypervisor and port assignment manager 218 can coordinate to apprise the hypervisor of the current domain assignments of the ports 201-210. In this way, even if an error in a traffic forwarding engine 312, 313 causes the traffic forwarding engine 312, 313 to request forwarding a packet to a port 201-210 assigned to a different domain, the hypervisor will prevent such forwarding by denying access to the port controller 301-310 corresponding to that port 201-210.

The hypervisor can be a native (Type-1) hypervisor that executes directly on the hardware of the switch 300. Example hypervisors that can be used include sel4 and XEN. In an example, the hypervisor can be a trusted platform to provide further assurance of secure operation. In an example, the hypervisor can provide EAL6 or higher virtualization.

In another example, the operating system 214 is a secure kernel that can control access of the traffic forwarding engines 312, 313 to the port controllers 301-310. In an example, each forwarding rule custodian 216, 217, traffic forwarding engine 312, 313, and port controller 301-310 can be implemented in a distinct container on the secure kernel and the kernel can control access of/to the containers. The kernel can grant access for each traffic forwarding engine 312, 313 to the port controller(s) 301-310 corresponding to the ports 201-210 that are assigned to a common domain with the traffic forwarding engine 312, 313. The kernel, however, can provide no access to port controllers 301-310 in domains different than the domain of a traffic forwarding engine 312, 313. If a traffic forwarding engine 312 requests forwarding of a packet to a port 210 that is in a different domain than the traffic forwarding engine 312 is in, the kernel will prevent such forwarding by denying access of the traffic forwarding engine 312 to the port controller 310 for that port 210. The kernel and port assignment manager 218 can cooperate to apprise the kernel of the current domain assignments of the ports 201-210. In this way, even if an error in a traffic forwarding engine 312, 313 causes the traffic forwarding engine 312, 313 to request forwarding a packet to a port 201-210 assigned to a different domain, the kernel will prevent such forwarding by denying access to the port controller 301-310 corresponding to that port 201-210.

Example secure kernels that can be used include the sel4 microkernel, Linux containers (LXC), kernel-based virtual machine (KVM), and separation kernel protection profile (SKPP). In an example, the kernel can be a trusted platform to provide further assurance of secure operation.

In an example, external communication from the switch 300 is limited to the management plane communicator 222 to provide additional security against malicious attempts to reconfigure the switch 300. Internal communication with the forwarding table custodians 216, 217, forwarding traffic engines 312, 313, port controllers 301-310, port assignment manager 218, and management plane communicator 222 can be controlled by the operating system 214 (e.g., hypervisor or secure kernel).

To provide further assurance of domain isolation, the operating system 214 can assign each forwarding rule custodian 216, 217 and/or traffic forwarding engine 312, 313 a distinct block of memory to ensure that forwarding rule custodians 216, 217 and/or traffic forwarding engine 312, 313 do not share memory space. This memory block control can be implemented, for example, by the hypervisor controlling access to the memory for the virtual machines for the respective modules. Stack and heap memory can also be allocated by blocks to a single domain to assure that temporary data structures created during packet analysis and forwarding cannot accidentally or intentionally be accessed by software in two different domains.

Figure 4:
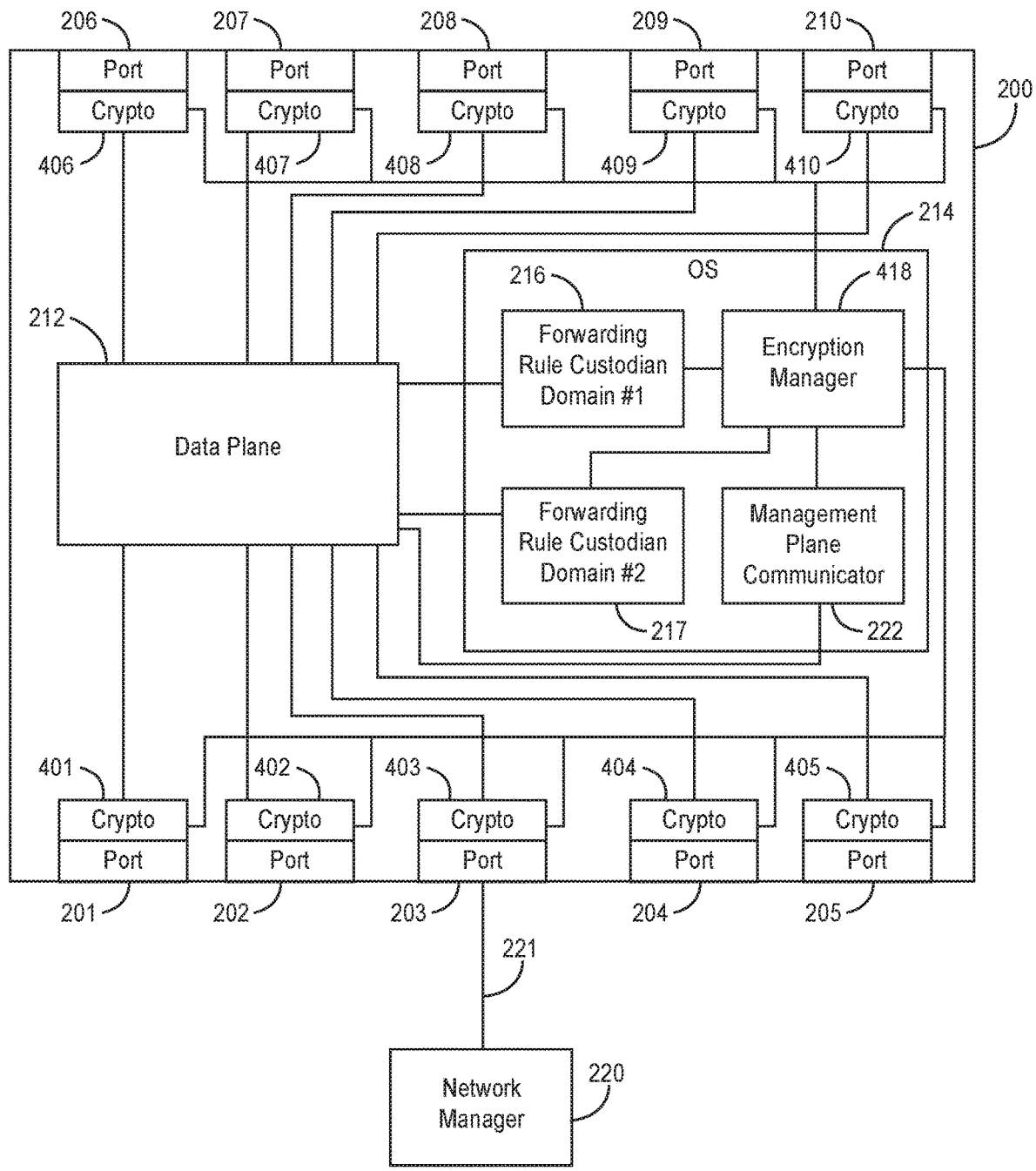
FIG. 4 is a block diagram of yet another example network switching device for implementing the method of FIG. 1.

FIG. 4 is a block diagram of another example switch 400 implementing method 100 of FIG. 1. Switch 400 includes a plurality of ports 201-210 and a data plane 212 which implements forwarding rules to forward packets between the plurality of ports 201-210. The data plane 212 can be hardware implemented, or software implemented. A hardware implemented data plane includes a switch matrix that selectively couples packets from an incoming port 201-210 to an outgoing port 201-210. A software implemented data plane includes one or more software implemented traffic forwarding engines which couple packets between the ports 201-210. In contrast to the traffic forwarding engines of FIG. 3, the traffic forwarding engines implemented in switch 400 can be either distinct traffic forwarding engines for each domain, or a common traffic forwarding engine can be used for multiple domains. In either case, switch 400 can assure isolation between domains as described below.

Switch 400 also includes an operating system 214 upon which the software applications of the switch 400 run. Although not shown in FIG. 4, switch 400 includes one or more processing devices, coupled to memory. The one or more processing devices can include any one or more of a general-purpose processor (e.g., a central processing unit (CPU)) and a special-purpose processor (e.g., a digital signal processor (DSP) or graphics processing unit (GPU)). The memory can include any suitable form of random access memory (RAM) now known or later developed, such as dynamic random access memory (DRAM), as well as other types of memory. Switch 400 also includes one or more data storage mediums coupled to the one or more processing devices. The one or more data storage mediums can include any suitable computer readable medium providing non-volatile data storage including, but not limited to, magnetic media such as a hard disk drive (HDD), optical media such as a CD, DVD, or Blu-ray disk, and non-volatile electric media such as a solid-state drive (SSD), flash media, or EEPROM.

Switch 400 includes instructions stored or otherwise embodied on its respective one or more data storage mediums. The instructions, when executed by the one or more processing devices of the switch 400, cause the switch 400 to perform the actions coded in the instructions. The instructions include the operating system 214. In some examples, the switch 400 also includes one or more programmable logic devices (e.g., an FPGA). Such programable logic devices can include programming to implement software defined traffic forwarding engines for a software implemented data plane 212. In other examples, the software defined traffic forwarding engines can be included in the instructions for the one or more processing devices and can run on the operating system 214.

The switch 400 can implement one or more forwarding rule custodians 416 to maintain one or more forwarding tables for the data plane 212. The one or more forwarding rule custodians 416 can run on the operating system 214. In contrast to the switch 200 of FIG. 2, a distinct forwarding rule custodian 416 can be implemented for each domain, or a common forwarding rule custodian 416 can be implemented for multiple domains. In either case, switch 400 can assure isolation between domains as described below.

Switch 400 assures isolation between domains via encrypting packets for different domains with different encryption keys. Switch 400 includes a plurality of encryption modules 401-410 for encrypting and decrypting packets sent and received via the ports 201-210. Each encryption module 401-410 can encrypt packets received at one or more ports 201-210 and can decrypt packets sent from one or more ports 201-210. The encryption modules 401-410 can encrypt and decrypt the payload of a (e.g., Ethernet) packet, while the IP header remains unencrypted to allow for the information in the IP header to be used for switching decisions by the data plane 212. In the example shown in FIG. 4, each port 201-210 has a distinct encryption module 401-410. The encryption modules 401-410 can be software modules that run on the operating system 214 or can be implemented in one or more programmable logic devices. The encryption modules 401-410 can be coupled to the ports 201-210 and can selectively encrypt/decrypt packets for the ports 201-210 coupled to the respective module 401-410. An encryption manager 418 can control the encryption modules 401-410 to control whether encryption/decryption is performed for a corresponding port 301-310 and, if so, what keys are used.

The encryption manager 418 can be a software module included in the instructions on the data storage medium of the switch 400, and can run on the operating system 214. The encryption manager 418 can manage the encryption of ports 201-210 to effectuate isolation of domains as described below.

In an example, the encryption modules 410-410 can perform independently encryption and decryption for each port 201-210 of the switch 400. That is, the encryption modules 401-410 can encrypt/decrypt packets using a different encryption key and a different decryption key for each port 201. The encryption manager 418 manages the encryption modules 401-410 in response to commands received over a network interface (e.g., port 201-210), a command line interface, or an application programming interface (API). In the example shown in FIG. 4, the encryption manager 418 communicates over a port 203 with a network manager 220 that is located on a device external to the switch 200. The network manager 220 communicates with the encryption manager 418 to provide commands to the port assignment manager 218 to assign an encryption key and decryption key to port 201-210. In an example, the network manager 220 is a management plane entity that has a wider view of the network and manages port assignments to implement multiple isolated domains across a network. The communications between the network manager 220 and the encryption manager 418 can be layer 2 or layer 3 messages, for example. Example network managers 220 are described in the U.S. patent application Ser. No. 15/583,692, U.S. patent application Ser. No. 15/583,711. In other examples, commands to assign an encryption key and decryption key to a port 201-210 can be received from an administrator (i.e., a human that administers the switch 400) via command line interface or API.

The switch 400 can also include a management plane communicator 222 that intermediates communication between the encryption manager 418 and the network manager 220. The management plane communication 222 can communitive with the network manager 220 over the corresponding port 203 using the protocol of the network manager 220 (e.g., the OpenFlow protocol) and communicate with the encryption manager 418 using the communication protocol of the encryption manager 418 to realize the encryption/decryption key assignment state reflecting the communicated commands of the network manager 220. In an example, the encryption manager 418 dedicates a port 203 of the switch 200 to communications with a network manager 220. To dedicate the port 203 to such communications, the encryption manager 418 controls the encryption module 403 coupled to the port 203 to enable and load the appropriate encryption/decryption keys or disable the encryption module 403 as appropriate to ensures that traffic to and from the port 203 is legible for the management plane communicator 222 and network manager 220. The management plane communicator 222 can also authenticate the network manager 220 to ensure encryption/decryption key assignments are being received from a proper entity.

As mentioned above, switch 400 achieves domain isolation by encrypting data of different domains with different keys. In an example, the packets for each domain can be encrypted with one of a respective set of symmetric encryption keys, wherein each domain is encrypted with a disjoint set of symmetric keys to ensure that the same encryption key is not used in multiple domains. In an example, each domain uses a single encryption key, while in other examples, multiple encryption keys can be used in a given domain. In other examples, asymmetric encryption can be used.

With the packets in each domain encrypted with different keys, the encryption on the packets assures isolation of the data as long as the decryption keys for each domain are kept secret from other domains. This crypto-partitioning of the switch 400 (i.e., the packets traversing the switch 400) enables isolation between the domains to be maintained regardless of how the data plane 212 and forwarding rule custodians 416 are implemented. Thus, this crypto-partitioning can be used on a switch instead of or in addition to the domain isolation techniques described above with respect to FIGS. 2 and 3.

In an example, the crypto-partitioning of the packets is implemented within the switch 400, but all packets incoming to and outgoing from the switch 400 are unencrypted, at least as corresponds to the domain encryption/decryption. Encryption for other purposes (e.g., for transport layer security of the hypertext transfer protocol) can still be used on the packets. In such an example, the encryption manager 418, in response to commands from a network manager 220 or administrator as discussed above, enables the encryption module 401-410 for each port 201-210 that is assigned to a domain. Moreover, the encryption manager 418 loads encryption keys into the encryption modules 401-410 such that the packets incoming into each port 201-210 that is assigned to a domain are encrypted with an encryption key corresponding to the domain to which that port 201-210 is assigned. Likewise, the encryption manager 418 loads decryption keys into the encryption modules 401-410 such that the packets outgoing from each port 201-210 that is assigned to a domain are decrypted with a decryption key corresponding to the domain to which that port 201-210 is assigned.

Overall, the encryption manager 418 controls the encryption modules 401-410 such that each packet received at a port 201-210 is encrypted with a key of a domain to which that port 201-210 is assigned, and each packet sent from a port 201-210 is decrypted with a key to which that port 201-210 is assigned. Any ports 203, used for control communications with a network manager 220 can be encrypted/decrypted with key(s) that are distinct from the keys used for the domains or can be unencrypted. In this way, the encryption manager 418 ensures that all domain packets traversing the switch 400 are encrypted with keys corresponding to their domains. By encrypting the data upon ingress into the switch 400 (i.e., prior to being acted on by the data plane 212) the data is safe from surreptitious or accidental error forwarding by the data plane 212. For example, if an error causes the data plane 212 to forward a packet received at a port 201 assigned to a first domain to a port 210 assigned to a second domain, the encryption module 410 coupled to the port 210 assigned to the second domain will attempt to decrypt the packet with a decryption key corresponding to the second domain, whereas the packet was encrypted by the encryption module 401 coupled to the port 201 assigned to the first domain. Accordingly, the encryption module 410 will not be able to decrypt the packet such that the packet will not be sent from the port 210 in a legible format. If such a situation occurs, the switch 400 can either discard the non-decrypted packet or send the non-decrypted packet in the normal manner, in which case the destination device for the encrypted packet will not be able to decrypt it.

Figure 5:
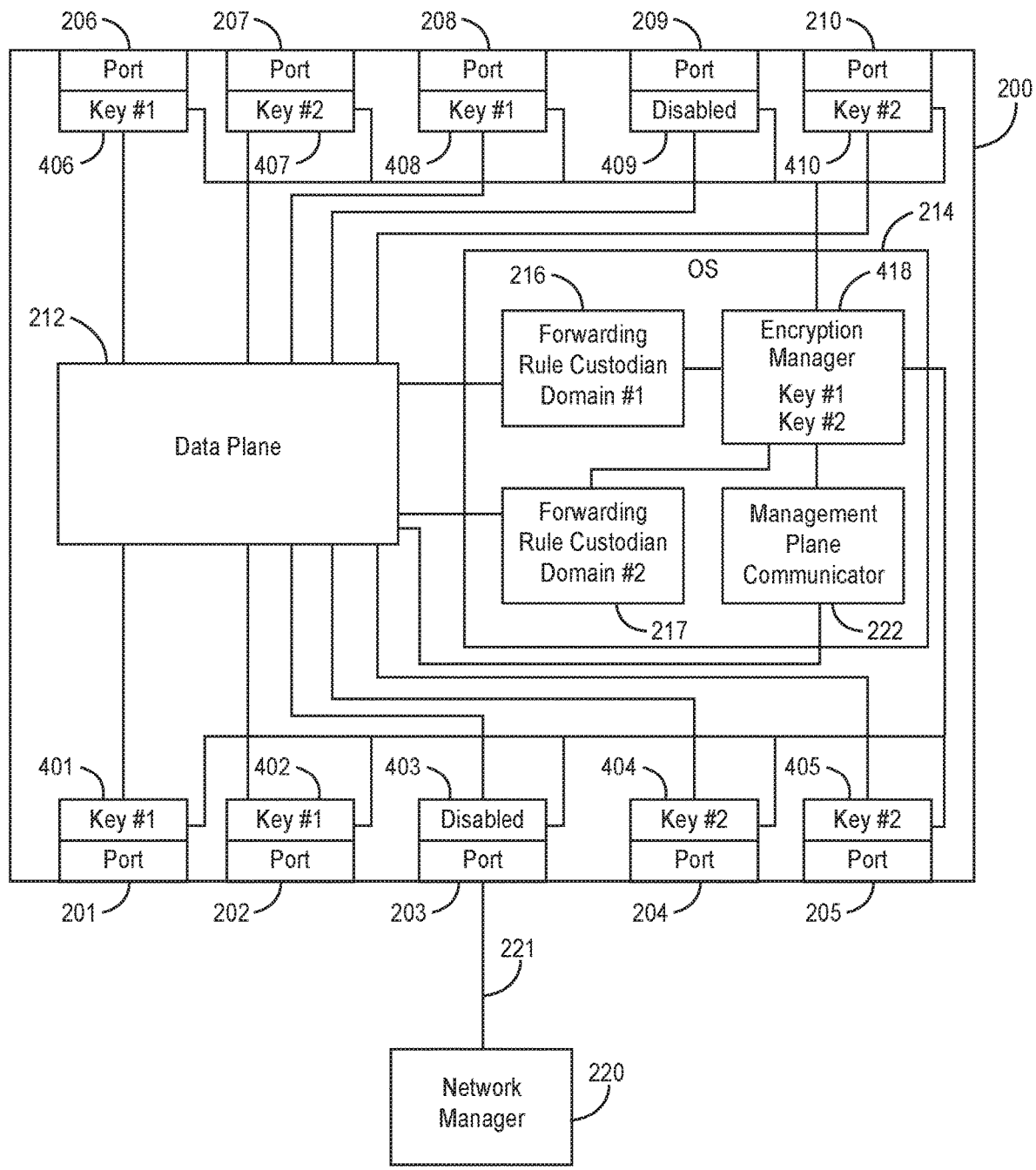
FIG. 5 is a block diagram of an example of the network switching device of FIG. 4 implementing multiple domains with different encryption keys.

FIG. 5 is a block diagram of an example switch 400 illustrating an implementation of encryption/decryption keys for implementing multiple domains. In this example, symmetric encryption is used and a single key is used for encryption and decryption for a domain. Each domain has a distinct encryption/decryption key. In the example switch 400 of FIG. 5, the encryption module 418 has assigned ports 201, 202, 206, and 208 to a first domain by enabling encryption modules 401, 402, 406, and 408, which are respectively coupled to ports 201, 202, 206, and 208, and loading a first key corresponding to the first domain into encryption modules 401, 402, 406, and 408. Encryption modules 401, 402, 406, and 408 will encrypt each packet received at ports 201, 202, 206, 208 with the first key and decrypt each packet sent from ports 201, 202, 206, 208 with the first key.

The encryption module 418 has also assigned ports 204, 205, 207, and 210 to a second domain by enabling encryption modules 404, 405, 407, and 410, which are respectively coupled to ports 204, 205, 207, and 210, and loading a second key corresponding to the second domain into encryption modules 404, 405, 407, and 410. Encryption modules 404, 405, 407, and 410 will encrypt each packet received at ports 204, 205, 207, and 210 with the second key and decrypt each packet sent from ports 204, 205, 207, and 210 with the second key.

The encryption manager 418 has assigned port 203 for communication with the network manager and disables the encryption module 403 for that port 203. Port 209 is unassigned (e.g., unused) and the encryption manager 409 for that port can also be disabled. In an example, one or more ports 201-210 can be used for a backbone/trunk connection to another switch. In such a situation, the encryption module 401-410 for the backbone/trunked port 201-210 can be disabled allowing the domain encrypted packets to pass between the switches. Accordingly, packets from multiple domains can travel over the same network link 101 (e.g., physical communication media) concurrently between the switches, relying on the differing encryption to maintain isolation of the different domains. The other switch can also encrypt and decrypt packets in the same manner as switch 400 to maintain the different encryption of data across the two switches. The two switches can be configured by a network manager 220 or administrator to cooperate in this way.

The commands from the network manager 220 or administrator that the encryption manager 418 follows to assign a port 201-210 to a domain can be commands to assign ports 201-210 to respective domain, wherein the commands do not include the keys to use for encryption and decryption. In such an example, the encryption manager 418 can generate its own keys to use for the domains. In other examples, the commands from the network manager 220 or administrator can include the keys that the encryption modules 401-410 are to use (e.g., the commands can instruct a specific key to use for a specific port 201-210).

Figure 6:
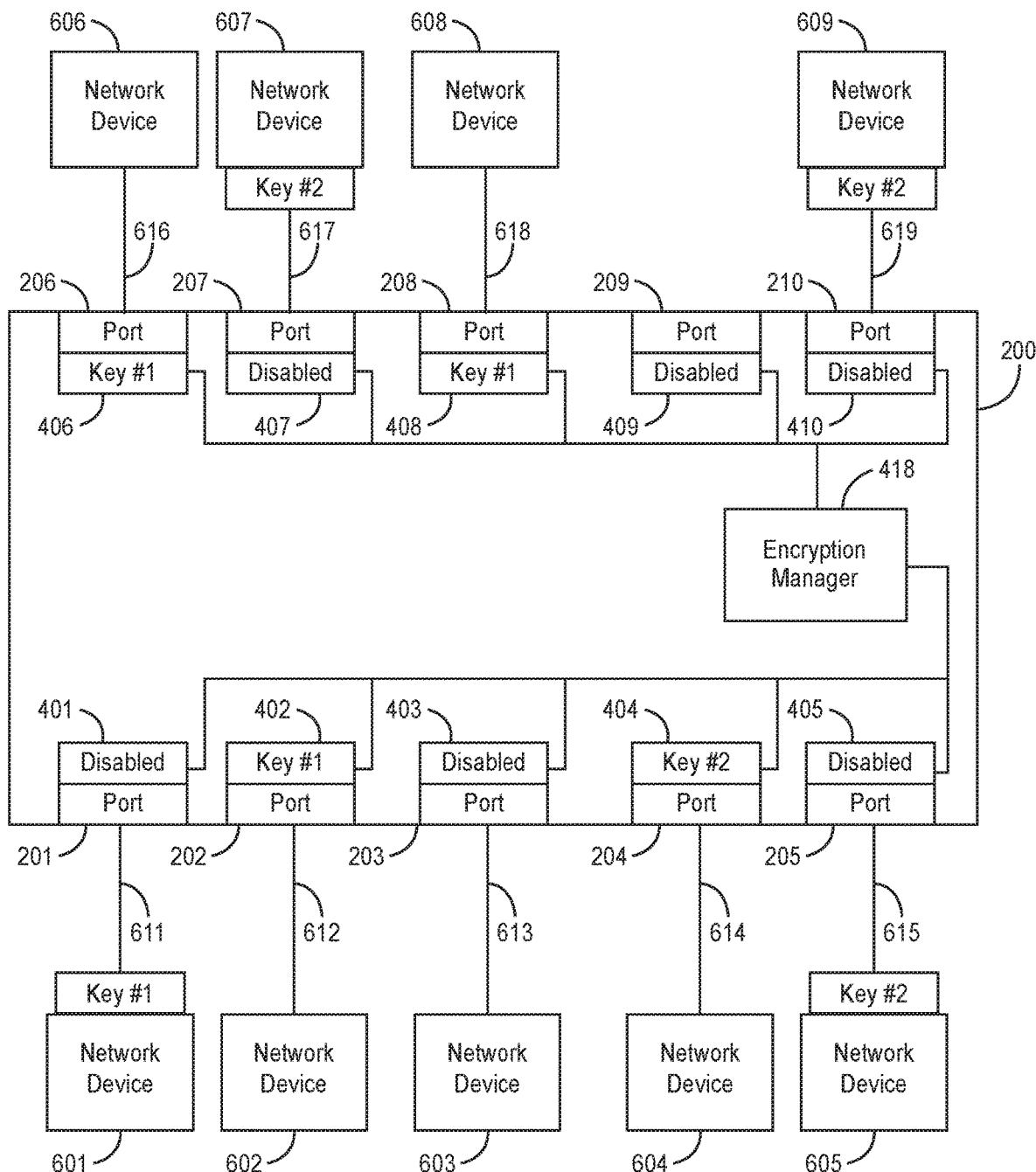
FIG. 6 is a block diagram of an example network including the network switching device of FIG. 4.

FIG. 6 is a block diagram of an example network 600 in which a crypto-partitioned switch 400 can be used. In some examples, the crypto-partitioned switch 400 can be used as part of a larger crypto-partitioning scheme to implement crypto-partitioning within the switch 400 as well as over one or more network links 601 coupling the switch 400 to another network device. In such an example, encryption and decryption to maintain isolation of packets in different domains, can occur in other network devices, in addition to the network switch 400.

For example, a first network device 601 can be communicatively coupled over a first network link 611 with a first port 201 of the switch 400. The first port 201 can be assigned to a first domain. Instead of encrypting and decrypting packets using the encryption module 401 coupled to the first port 201, however, the encryption and decryption of packets can be performed by the first network device 601. Thus, the encryption manager 418 of the switch 400 can disable the encryption module 401 corresponding to the first port 201.

Overall, the encryption manager 418 can disable each encryption module 401-410 corresponding to ports 201-210 that is assigned to a domain, but has a network device 601-610 communicatively coupled to that port 201-210 that performs the domain encryption/decryption. The encryption manager 418, however, can enable each encryption module corresponding to ports 201-210 that is assigned to a domain and does not have a network device 601-610 communicatively coupled to that port 201-210 that performs the domain encryption/decryption. In this case, the encryption manager 418 can load the encryption/decryption keys for the domain of the corresponding port 201-210 into the encryption module 401-410 in the manager described above with respect to FIG. 5.

To implement a network 600 in which some of the domain encryption/decryption is performed by the network devices, a network manager 220 or administrator with a wider view of the network 600 is used to manage the encryption. The network manager 220 or administrator can send commands to the switch 400 instructing the switch 400 as to which ports 201-210 to encrypt/decrypt and with which key and which ports 201-210 to maintain unencrypted (i.e., have the encryption module 401-410 disabled). The switch 400 can use the IPsec protocol as standardized by the Internet Engineering Task Force (IETF) to encrypt and decrypt packets In an example, the ports 201-202 of the switch 200, 400 can be dynamically re-assigned to a different domain. That is, while the data plane 212 of the switch 200, 400 is forwarding packets between ports 201-210 one or more of the ports 201-210 that had previously been assigned to a domain can be re-assigned to another domain. Moreover, this re-assignment can occur remotely, i.e., without requiring an administrator to have physical access to the switch 200, 400. The domain re-assignment can occur remotely by having the network manager 220 send commands to the switch over a network link in the manner discussed above. In response to receiving a command to assign (re-assign) a port 201 to a second domain when that port 201 had previously been assigned to a first domain, the port assignment manager 218 or encryption manager 418 can remove the port 201 from the first domain and assign the port to the second domain.

In the example switch 300 of FIG. 3, removing a port 201 from the first domain can include destroying the port controller 301 corresponding to the port 201 or revoking access to the port controller 301. Revoking access to the port controller 301 can include revoking the access of the virtual machine or container in which the traffic forwarding engine 312 for the first domain is running to the virtual machine or container in which the port controller 301 is running. Destroying of the port controller 301 or revoking access to the port controller 301 can be accomplished by the hypervisor or kernel operating system 214 in coordination with the port assignment controller 218. The port assignment controller 218 can receive the command to re-assign the port 201 and can provide information to the operating system 214 such that the operating system 214 destroys or revokes access to the port controller 301. The port assignment controller 218 can also instruct the forwarding rule custodian 216 for the first domain to remove the port 201 from its forwarding table. The forwarding rule custodian 216 will then remove the port 201 from its forwarding table and load updated forwarding rules into the traffic forwarding engine 312.

Once the port 201 is removed from the first domain, the re-assignment can be completed by adding the port 201 to the second domain. The port 201 can be added to the second domain through coordination between the port assignment manager 218 and the operating system 214. The port assignment manager 218 can provide information to the operating system 214 such that the operating system 214 grants access for the traffic forwarding engine 313 for the second domain to a port controller 301 for the port 201 being assigned. In examples where the port controller 301 was destroyed during removal of the port 301 from the first domain, the operating system 214 can initiate a new instance of the port controller 301. For example, a new virtual machine or container with a new instance of the port controller 301 running therein. The operating system 214 can be a hypervisor or secure kernel as discussed above. In addition to granting access for the traffic forwarding engine 313 to the port controller 301, the port assignment manager 218 can instruct the forwarding rule custodian 217 for the second domain to add the port 201 to its forwarding table. The forwarding rule custodian 217 will then add the port 201 to its forwarding table and load updated forwarding rules into the traffic forwarding engine 313.

Granting and removing access between virtual machines in the XEN hypervisor can be accomplished by granting and rescinding permissions for a software inter-VM communication channel between the virtual machines. Hardware assignment tables can also be modified to grant and revoke access. Since the hypervisor has ultimate control over access to the port controllers 301-310, access to the port controllers 301-310 can only be achieved through the hypervisor, in coordination with the port assignment manager 218.

Dynamic reassignment in the switch 400 of FIG. 4 can be performed by the encryption manager 418 updating the key(s) used by the encryption module 401 corresponding to the port 201 being re-assigned. For example, if port 201 is currently assigned to the first domain and is being re-assigned to the second domain, the encryption manager 418 can load in the key(s) corresponding to the second domain into the encryption module 401 for the port 201. If the port 201 is to be used in the second domain with a network device 602 that will be performing the domain encryption/decryption, the encryption manager 418 can disable the encryption module 401 for the port 201. These actions by the encryption manager 418 can be performed in response to corresponding commands from the network manager 220 or administrator. The forwarding tables/rules in the switch 400 would also likely be updated to account for the new network topology. This update can occur in a conventional manner, if the forwarding table and data plane 212 are implemented in such a conventional manner. If the forwarding table and data plane 212 are implemented as described above with respect to FIG. 3, updating the forwarding table can occur as is described above.

In this way, the switch 200, 300, 400 can dynamically re-assign ports 201-202 from a first domain to a second domain to enable each port 201-210 to be assigned to different domains at different times.

The domains implemented by the switch 200, 300, 400 can be used for any suitable purpose. An example purpose is to ensure respective set of information remain distinct from one another. For example, in a medical setting is may be desired to maintain patient medical information separation from other information, such as billing and management information. Another example is in a passenger vehicle (e.g., car, aircraft, etc.) where it is desirable to keep passenger data (e.g., passenger internet traffic) separate from data used to operate the vehicle (e.g., vehicle sensor or navigation data). The domains can also be used to implement multiple security classifications of data in the same network. For example, it may be desirable to keep secret data separate from secure but unclassified (SBU) data and ensure that SBU applications do not have access to secret data or other secret applications.

An example switch 200, 300, 400 as described herein is the High-Assurance Dynamically Partitioned Network Switch (HAS) described in U.S. Provisional Patent Application No. 62/329,394, titled "HIGH-ASSURANCE DYNAMICALLY PARTITIONED NETWORK SWITCH".

What is claimed is:

1. A program product for implementing multiple domains in a network switching device having a plurality of hardware ports, the program product comprising:
instructions which, when executed by one or more processing devices, cause the one or more processing devices to:
assign the plurality of hardware ports to a plurality of domains with a port assignment manager, wherein hardware ports are assigned to at least two of the plurality of domains, and none of the plurality of hardware ports are concurrently assigned to multiple domains of the plurality of domains, wherein hardware ports can only be assigned by the port assignment manager;
maintain first forwarding rules for a first domain with a first forwarding rule custodian, wherein the first forwarding rules direct forwarding only between hardware ports assigned to the first domain in accordance with the assignment from the port assignment manager; and
maintain second forwarding rules for a second domain with a second forwarding rule custodian, wherein the second forwarding rules direct forwarding only between hardware ports assigned to the second domain in accordance with the assignment from the port assignment manager.

2. The program product of claim 1, wherein the instructions cause the one or more processing devices to:
restrict access of the first forwarding rule custodian to hardware ports, wherein access is restricted for ports assigned to a domain other than the first domain; and
restrict access of the second forwarding rule custodian to hardware ports, wherein access is restricted for ports assigned to a domain other than the second domain.

3. The program product of claim 1, wherein the first forwarding rule custodian is executed in a first virtual machine of a hypervisor, the second forwarding rule custodian is executed in a second virtual machine of the hypervisor, and the port assignment manager is executed in a third virtual machine of the hypervisor.

4. The program product of claim 1, wherein the first forwarding rule custodian, the second forwarding rule custodian, and the port assignment manager are executed on a secure kernel.

5. The program product of claim 1, wherein the instructions cause the one or more processing devices to:
forward packets for the first domain with a first software implemented traffic forwarding engine, wherein the first software implemented traffic forwarding engine forwards packets only, in accordance with the first forwarding rules from the first forwarding rule custodian; and
forward packets for the second domain with a second software implemented traffic forwarding engine, wherein the second software implemented traffic forwarding engine forwards packets only in accordance with the second forwarding rules from the second forwarding rule custodian.

6. The program product of claim 5, wherein the instructions cause the one or more processing devices to:
deny requests of the first software implemented traffic forwarding engine that are directed to hardware ports assigned to a domain other than the first domain; and
deny requests of the second software implemented traffic forwarding engine that are directed to hardware ports assigned to a domain other than the second domain.

7. The program product of claim 5, wherein the first forwarding rule custodian is executed in a first virtual machine of a hypervisor, the second forwarding rule custodian is executed in a second virtual machine of the hypervisor, the port assignment manager is executed in a third virtual machine of the hypervisor, the first software implemented traffic forwarding engine is executed in a fourth virtual machine of the hypervisor, and the second software implemented traffic forwarding engine is executed in a fifth virtual machine of the hypervisor.

8. The program product of claim 7, wherein a first set of hardware ports are assigned to the first domain and a second set of hardware ports are assigned to the second domain, wherein the instructions cause the one or more processing devices to:
execute a first one or more port hardware controllers for the first set of hardware ports, and a second one or more port hardware controllers for the second set of hardware ports, each port hardware controller of the first one or more port hardware controllers and the second one or more port hardware controllers executing in a distinct virtual machine implemented by the hypervisor, wherein each port hardware controller of the first one or more port hardware controllers and the second one or more port hardware controllers implements a TCP/IP stack for a corresponding hardware port.

9. The program product of claim 8, wherein the instructions cause the one or more processing devices to:
re-assigning one or more ports of the first set of ports by:
removing the one or more ports from the first domain, wherein removing the one or more ports from the first domain includes:
destroying the respective port hardware controller corresponding to each of the one or more ports or revoking access to the respective port hardware controller corresponding to each of the one or more ports for the virtual machine corresponding to the first software implemented traffic forwarding engine; and
instructing the first forwarding rule custodian to no longer direct forwarding to or from the one or more ports;
assigning the one or more ports to the second domain, wherein assigning the one or more ports to the second domain includes:
granting access to a respective port hardware controller for each of the one or more ports for the virtual machine corresponding to the second software implemented traffic forwarding engine; and
instructing the second forwarding rule custodian to direct forwarding to and from the one or more ports.

10. The program product of claim 5, wherein the first forwarding rule custodian, the second forwarding rule custodian, the port assignment manager, the first software implemented traffic forwarding engine, and the second software implemented traffic forwarding engine are executed on a secure kernel.

11. The program product of claim 1, wherein the port assignment manager only assigns a hardware port to a domain in response to a command from the network manager, wherein the network switching device receives the command from the network manager over a network link.

12. The program product of claim 11, wherein a first pair of hardware ports on the network switching device are not assigned to any domain and are used for network communications between the port assignment manager and the network manager, the communications including commands instructing the port assignment manager to assign a first set of hardware ports to the first domain and a second set of hardware ports to the second domain.

13. The program product of claim 1, wherein the first forwarding rule custodian directs forwarding between all the ports of the plurality of ports assigned to the first domain, wherein the second forwarding rule custodian directs forwarding between all the ports of the plurality of ports assigned to the second domain.

14. The program product of claim 1, wherein the port assignment manager is configured to:
direct the first forwarding rule custodian to use only memory within a first block; and
direct the second forwarding rule custodian to use only memory within a second block, wherein the second block does not overlap the first block.

15. The program product of claim 1, wherein the instructions cause the one or more processing devices to:
encrypt outgoing packets and decrypt incoming packets at the plurality of hardware ports using a different encryption and decryption key for a hardware port assigned to the first domain than the encryption and decryption key for a hardware port assigned to the second domain.

16. The program product of claim 1, wherein the first domain corresponds to a first local area network (LAN) and the second domain corresponds to a second LAN.

17. A network switching device comprising:
a plurality of hardware ports;
a data plane to implement forwarding rules to forward packets between the plurality of hardware ports;
one or more processing devices;
memory coupled to the one or more processing devices; and
one or more data storage mediums coupled to the one or more processing devices, the one or more data storage mediums including instructions which, when executed by the one or more processing devices, cause the one or more processing devices to:
assign the plurality of hardware ports to a plurality of domains with a port assignment manager, wherein hardware ports are assigned to at least two of the plurality of domains, and none of the plurality of hardware ports are concurrently assigned to multiple domains of the plurality of domains, wherein hardware ports can only be assigned by the port assignment manager;
maintain first forwarding rules for a first domain with a first forwarding rule custodian, wherein the first forwarding rules direct forwarding only between hardware ports assigned to the first domain in accordance with the assignment from the port assignment manager; and
maintain second forwarding rules for a second domain with a second forwarding rule custodian, wherein the second forwarding rules direct forwarding only between hardware ports assigned to the second domain in accordance with the assignment from the port assignment manager.

18. The network switching device of claim 17, wherein the instructions cause the one or more processing devices to:
restrict access of the first forwarding rule custodian to hardware ports, wherein access is restricted for ports assigned to a domain other than the first domain; and
restrict access of the second forwarding rule custodian to hardware ports, wherein access is restricted for ports assigned to a domain other than the second domain.

19. The network switching device of claim 17, wherein the first forwarding rule custodian is executed in a first virtual machine of a hypervisor, the second forwarding rule custodian is executed in a second virtual machine of the hypervisor, and the port assignment manager is executed in a third virtual machine of the hypervisor.

20. The network switching device of claim 17, wherein the first forwarding rule custodian, the second forwarding rule custodian, and the port assignment manager are executed on a secure kernel.

21. The network switching device of claim 17, wherein the port assignment manager is configured to:
direct the first forwarding rule custodian to use only memory within a first block; and
direct the second forwarding rule custodian to use only memory within a second block, wherein the second block does not overlap the first block.

22. The network switching device of claim 17, wherein the instructions cause the one or more processing devices to:
encrypt outgoing packets and decrypt incoming packets at the plurality of hardware ports using a different encryption and decryption key for a hardware port assigned to the first domain than the encryption and decryption key for a hardware port assigned to the second domain.

23. The network switching device of claim 17, wherein the first domain corresponds to a first local area network (LAN) and the second domain corresponds to a second LAN.

* * * * *